No. 857,711. PATENTED JUNE 25, 1907.
J. E. ARNOLD.
HARROW.
APPLICATION FILED OCT. 11, 1906.
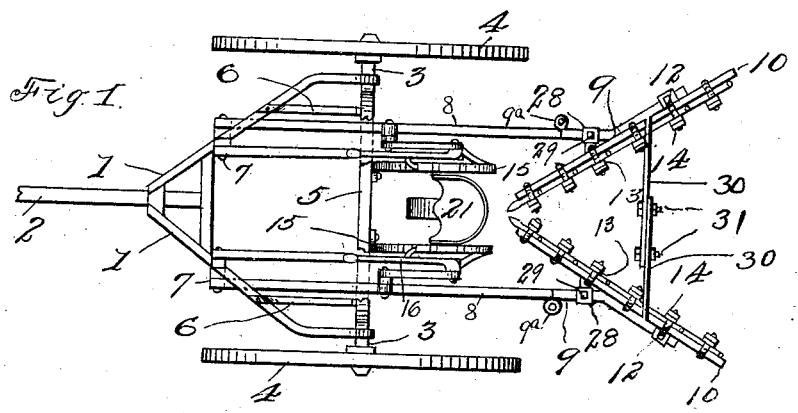
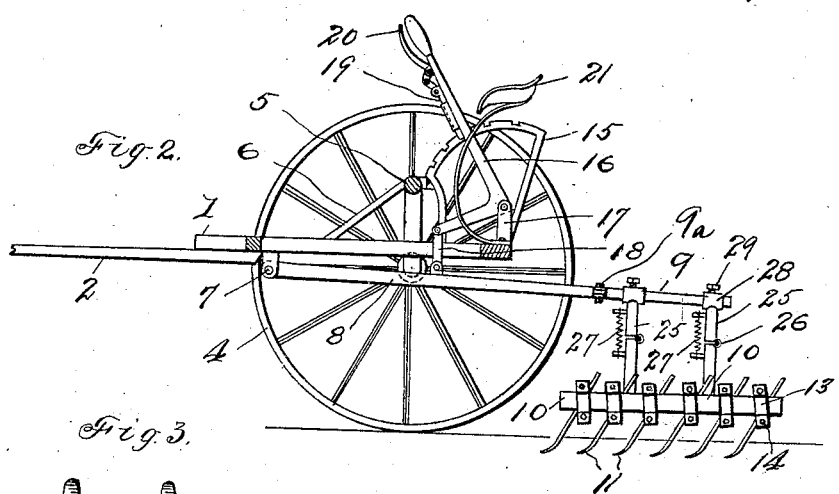
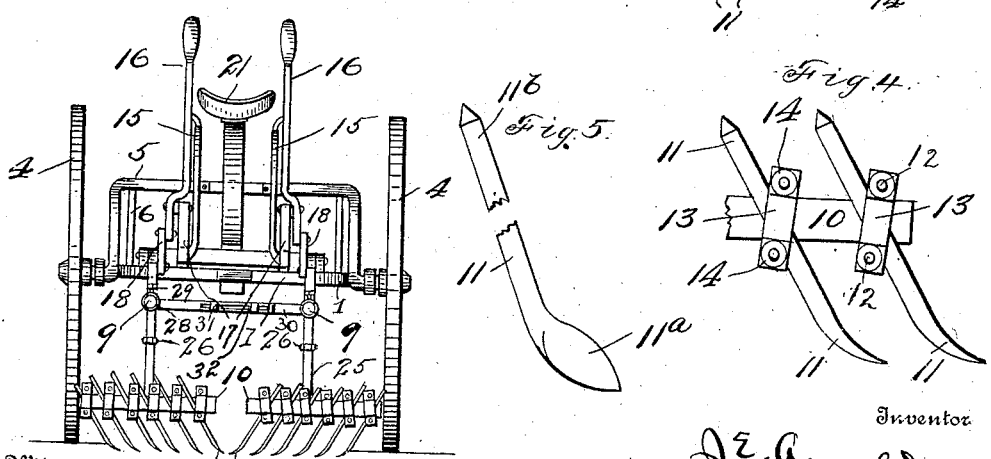
Witnesses
Chas. K. Davies.
John S. Powers
Inventor
J. E. Arnold
By Shepherd Parker
Attorneys

UNITED STATES PATENT OFFICE.

JESSE E. ARNOLD, OF HICO, TEXAS.

HARROW.

No. 857,711.　　　　Specification of Letters Patent.　　　　Patented June 25, 1907.

Application filed October 11, 1906. Serial No. 338,381.

*To all whom it may concern:*

Be it known that I, JESSE E. ARNOLD, a citizen of the United States, residing at Hico, in the county of Hamilton and State of Texas, have invented certain new and useful Improvements in Harrows, of which the following is a specification.

This invention relates to new and useful improvements in harrows and it particularly pertains to a harrow employed in the cultivation of cotton, corn, etc., and plants which grow in rows.

The invention aims as a primary object to provide a harrow which shall cultivate only one row at a time and which works upon sides of a row so that the central portion is not exposed to the rays of the sun as is the case where cultivators of the "sweep" type are used.

The invention aims as a further object to provide a harrow of the above type which can readily be attached to the beams of a cultivator of approved form.

The invention aims as a further object to provide a harrow in which a single blade embodies two different formations of teeth, either of which may be used as desired by properly positioning the blade.

The invention further aims to provide a device of the above type which shall be simple and inexpensive to manufacture and practical and efficient in use.

The detailed construction will appear in the course of the following description in which reference is had to the accompanying drawings forming a part of this specification, like numerals designating like parts throughout the several views, wherein Figure 1 is a top plan view of a harrow constructed in accordance with my invention. Fig. 2 is a central longitudinal section thereof. Fig. 3 is a rear elevation thereof. Fig. 4 is a detailed side elevation of the teeth, and the bar upon which they are carried, and Fig. 5 is a detailed perspective view of one of the teeth detached.

Referring specifically to the accompanying drawings, the numeral 1 designates a supporting frame of suitable shape and provided with a tongue 2. The side bars of the frame 1 have connection at their ends with an axle 3, upon which the wheels 4 are carried. In order to accommodate the various parts of the mechanism the axle 3 is bowed or raised as at 5 along its body portion and said axle is maintained in such position by means of inclined braces 6 connected with the frame 1. On each side of the frame 1 a depending lug 7 is provided to which are pivoted the cultivator beams 8. The beams 8 in the preferred embodiment of the invention are provided with obliquely extending arms 9 hinged thereto as at $9^a$ and carrying the cultivator tooth carrying bars 10. The bars 9 are connected by hobbles embodying sections 30, adjustably connected by bolts 31 projecting through registering slots 32. The hobbles may thus be varied in dimensions so as to vary the angular disposition of the arms 9 by moving them upon their pivots $9^a$. The bars 10 are secured to the diverging arms 9 by hangers 25 comprising sections hinged as at 26 so as to swing rearwardly, said sections being maintained normally in a straight angle by suitably secured retractile springs 27 interposed therebetween. The uppermost section of each hanger 25 terminates in a horizontal sleeve 28 which surrounds the beam 8, and is adjustably positioned thereupon by means of set screws 29. It will be readily apparent that if the blades carried by the bars 10 encounter a rock or other obstruction within the ground, that said bars will yield upwardly, the hinged sections having relative movement against the tension of the spring 27. Thus breakage or displacement of parts is prevented. The cultivator teeth 11 are positioned upon said bars 10 by means of suitable clamps, a novel embodiment of which is shown comprising U bolts 12 upon the ends of which clamping members 13 are carried, said clamping members being held in operative position by nuts 14. The cultivator teeth 11 project through the space between the bar 10 and the members 13 as is clearly shown in Fig. 4, and are clamped thereby at any desired height.

As shown in Fig. 5 each of the teeth 11 comprises a member formed at one end with a flattened blade $11^a$ and at its other end with a shank $11^b$ having the conformation of the ordinary harrow tooth. The use of the shank $11^b$ or the blade $11^a$ will depend entirely upon the existing conditions.

Means are provided for raising and lowering the cultivator beams and as shown such means comprises a notched quadrant 15 located on each side of the frame 1, a pivoted bell crank lever 16 supported upon a post 17 and having connection with the adjacent beam 8 by a link 18. The lever 16 is provided with a sliding pawl 19 operated by a pivoted hand member 20 and designed to engage any selected notch of the quadrant 15 in accordance with the position in which it is desired to have the respective beam 8. The driver's seat 21 of conventional form is supported between the levers 16.

It is preferred to have the teeth carrying bars 10 disposed in divergent relation as is clearly shown in Fig. 1 in order that the cultivation of a single row may be the more easily facilitated from either side thereof.

The manner of use will be readily apparent. The teeth 11 are set at the desired height by properly adjusting them in the clamps 13 and the entire series of teeth on each side of the apparatus may be raised and lowered at will to compensate for the inequalities of the ground by the proper manipulation of the lever 16.

While the elements herein shown and described are well adapted to serve the purposes set forth, it is obvious that various minor changes may be made in the proportions, shape and arrangement of the several parts without departing from the spirit and scope of my invention as defined in the appended claims.

Having fully described my invention I claim:

1. A cultivator comprising a wheeled frame, beams extending rearwardly thereof, hangers depending from said beams and comprising spring held pivoted sections, and tooth carrying bars fixed to the ends of said hangers.

2. A cultivator comprising a wheeled frame, parallel beams extending rearwardly thereof and including at their rear ends pivoted divergent angular sections, hangers depending from said sections, tooth carrying bars fixed to said hangers in coincident relation to said sections, and adjustably connected elements connecting said sections.

3. A cultivator comprising a wheeled frame, parallel beams pivotally suspended therefrom and extending rearwardly thereof, means for raising and lowering said beams on their pivots, said beams including at their rear ends pivoted divergent sections, hangers depending from said divergent sections, tooth carrying bars fixed to the lower ends of said hangers in coincident relation to said sections and adjustably connected elements connecting said sections.

4. A cultivator comprising a wheeled frame, parallel beams pivotally suspended therefrom and extending rearwardly thereof, means for raising and lowering said beams on their pivots, said beams including at their rear ends pivoted divergent sections, hangers depending from said divergent sections and comprising spring held pivoted sections, tooth carrying bars fixed to the lower ends of said hangers, and adjustably connected elements connecting said divergent sections.

In testimony whereof I affix my signature in presence of two witnesses.

JESSE E. ARNOLD.

Witnesses:
J. J. WOODALL,
T. J. WOODS.